United States Patent
Tsai et al.

(10) Patent No.: US 10,725,504 B1
(45) Date of Patent: Jul. 28, 2020

(54) KEYPAD MODULE LOCKING MECHANISM FOR MOBILE COMPUTING DEVICES

(71) Applicant: ZEBRA TECHNOLOGIES CORPORATION, Lincolnshire, IL (US)

(72) Inventors: I-Heng Tsai, Taipei (TW); Yanmin Mao, Brampton (CA); Carl A. Thelemann, East Islip, NY (US); Xinghua Shi, Milton (CA); Mu-Kai Shen, Taipei (TW); Ramana Reddy Palpunuri, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/657,546

(22) Filed: Oct. 18, 2019

(51) Int. Cl.
    *G06F 1/16* (2006.01)
(52) U.S. Cl.
    CPC .......... *G06F 1/1669* (2013.01); *G06F 1/1679* (2013.01)
(58) Field of Classification Search
    CPC combination set(s) only.
    See application file for complete search history.

(56) References Cited

U.S. PATENT DOCUMENTS

| | | | | |
|---|---|---|---|---|
| 5,410,141 A * | 4/1995 | Koenck | ............... | B60R 11/02 235/472.02 |
| 5,679,943 A * | 10/1997 | Schultz | ............... | G06F 1/1626 235/472.02 |
| 6,031,524 A * | 2/2000 | Kunert | ............... | G06F 3/0202 345/169 |
| 6,109,528 A * | 8/2000 | Kunert | ............... | G06K 7/10881 235/462.45 |
| 6,320,743 B1 * | 11/2001 | Jin | ............... | G06F 1/1616 361/679.08 |
| 6,493,215 B1 * | 12/2002 | Chiang | ............... | G06F 1/1616 361/679.08 |
| 6,751,089 B2 * | 6/2004 | Hsieh | ............... | G06F 1/1616 235/472.01 |
| 6,909,906 B1 * | 6/2005 | Miyashita | ............... | G06F 1/1615 345/163 |
| 7,173,606 B2 * | 2/2007 | Honkala | ............... | G06F 1/1616 345/169 |
| 7,175,094 B2 * | 2/2007 | Bhatia | ............... | G06K 7/10881 235/472.01 |
| 7,440,770 B2 * | 10/2008 | Miyashita | ............... | G06F 1/1615 345/163 |

(Continued)

*Primary Examiner* — Lisa Lea-Edmonds

(57) ABSTRACT

A mobile computing device includes: a housing with a lower wall, a keypad seat and side walls joining the lower wall to the keypad seat and extending upwards from the keypad seat to a bay opening. The walls define an access compartment between the lower wall, the side walls and the keypad seat, and a keypad bay for a keypad module between the keypad seat, the side walls and the bay opening. The device includes a latch slidably mounted to the keypad seat between locked and unlocked positions, including: a hook to engage a keypad module recess in the locked position and secure the keypad module in the bay, and to disengage from the recess in the unlocked position to enable removal of the keypad module; and an activation member in the access compartment to receive an input to transition the latch from the unlocked position to the locked position.

20 Claims, 7 Drawing Sheets

(56) References Cited

U.S. PATENT DOCUMENTS

| | | | | |
|---|---|---|---|---|
| 7,929,283 B2* | 4/2011 | Wang | ............... | G06F 1/1616 |
| | | | | 361/679.17 |
| 8,199,489 B2* | 6/2012 | Mangaroo | ............. | G06F 1/1626 |
| | | | | 235/472.01 |
| 8,238,084 B2* | 8/2012 | Chen | ............... | G06F 1/1616 |
| | | | | 361/679.14 |
| 8,238,085 B2* | 8/2012 | Wu | ............... | G06F 1/1616 |
| | | | | 312/223.1 |
| 8,593,793 B2* | 11/2013 | Gandhi | ............. | G06F 1/1656 |
| | | | | 361/679.01 |
| 10,063,023 B2* | 8/2018 | Kang | ............... | G06F 1/1669 |
| 10,545,533 B1* | 1/2020 | Shen | ............... | G06F 1/1626 |
| 2005/0035950 A1* | 2/2005 | Daniels | ............. | G06F 1/1616 |
| | | | | 345/169 |
| 2005/0201067 A1* | 9/2005 | Hu | ............... | G06F 1/1626 |
| | | | | 361/730 |
| 2006/0266841 A1* | 11/2006 | Hansen | ............. | G06F 1/1626 |
| | | | | 235/472.02 |
| 2007/0201194 A1* | 8/2007 | Chen | ............... | G06F 1/1616 |
| | | | | 361/679.09 |
| 2010/0073869 A1* | 3/2010 | Mangaroo | ............. | G06K 7/0004 |
| | | | | 361/679.55 |
| 2011/0072725 A1* | 3/2011 | Cheng | ............. | G06F 1/1679 |
| | | | | 49/279 |
| 2011/0211308 A1* | 9/2011 | Gleeson | ............. | G06F 1/1669 |
| | | | | 361/679.11 |
| 2015/0355681 A1* | 12/2015 | Chen | ............... | G06F 1/1654 |
| | | | | 361/679.56 |

* cited by examiner

KEYPAD MODULE LOCKING MECHANISM FOR MOBILE COMPUTING DEVICES

BACKGROUND

Mobile computing devices are deployed in a wide variety of environments. Certain applications of such devices may require different input assemblies, such as keypads with varying layouts. Accommodating the installation and removal of multiple input assemblies can be costly and time-consuming. Further, keypads may be required to be guarded against entry of fluids, dust and the like, further increasing the cost and complexity of their assembly.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
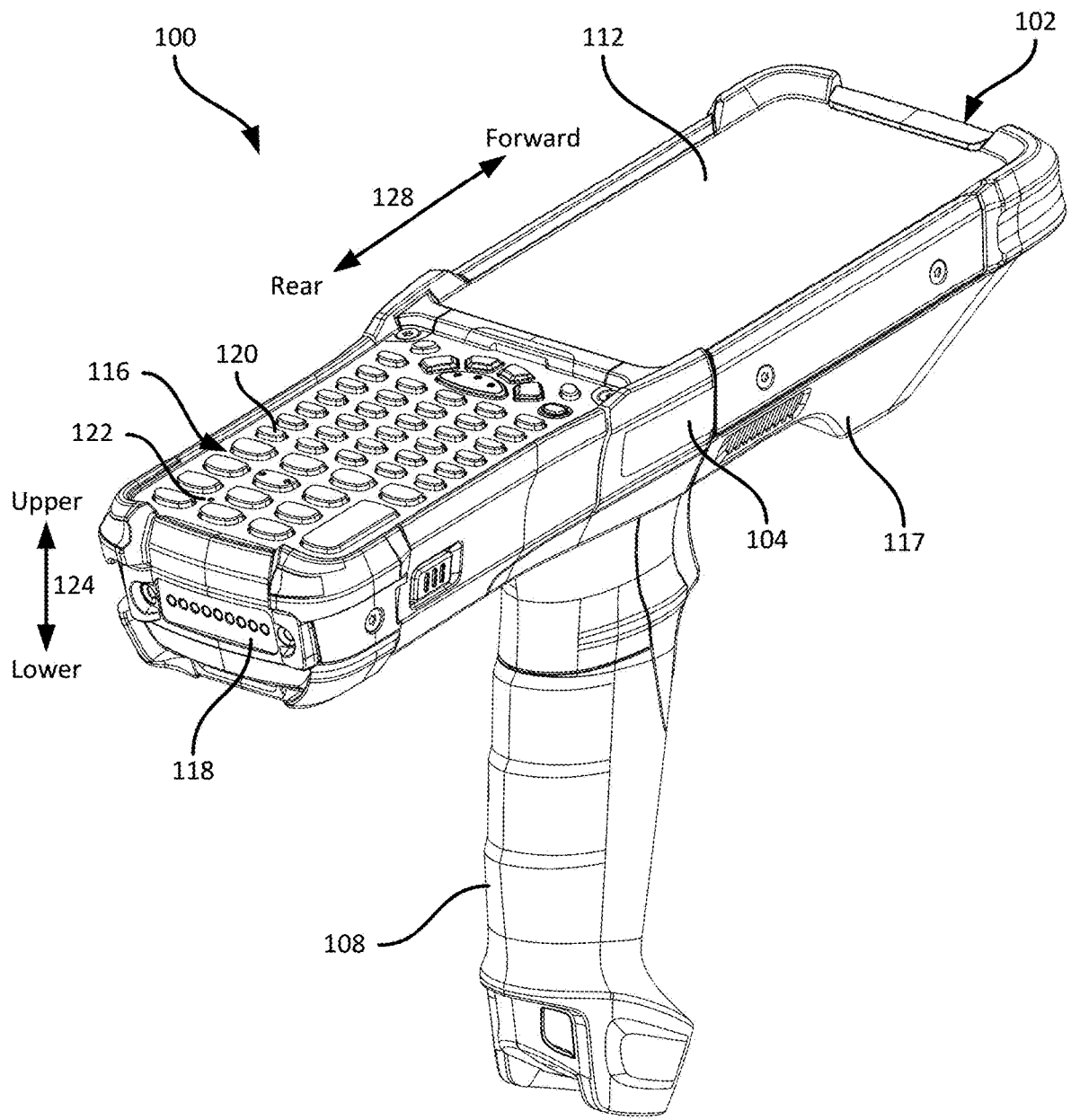
FIG. 1 is an isometric view of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device, comprising: a device housing including: a lower wall; a keypad seat; side walls joining the lower wall to the keypad seat and extending upwards from the keypad seat to a bay opening, to define (i) an access compartment between the lower wall, the side walls and the keypad seat, and (ii) a keypad bay between the keypad seat, the side walls and the bay opening, the keypad bay configured to receive a keypad module; a latch slidably mounted to the keypad seat and movable between a locked position and an unlocked position, the latch including: a hook configured to engage a corresponding recess of the keypad module in the locked position and secure the keypad module in the keypad bay, and to disengage from the recess in the unlocked position to enable removal of the keypad module; and an activation member disposed within the access compartment and configured to receive an input to transition the latch from the unlocked position to the locked position.

Additional examples disclosed herein are directed to a method of installing a keypad module in a mobile computing device, the method comprising: placing the keypad module in a keypad bay of the mobile computing device defined by a keypad seat and a plurality of side walls; and applying, via an access compartment below the keypad bay, an input to an activation member of a latch to transition the latch from an unlocked position to a locked position to secure the keypad module in the keypad bay.

FIG. 1 depicts a mobile computing device 100, also referred to herein as the mobile device 100 or simply the device 100, which may be deployed in a wide variety of environments, including transport and logistics facilities (e.g. warehouses), healthcare facilities, and the like. The mobile device 100 in the example illustrated in FIG. 1. includes a housing 102 including a body portion 104 (also referred to as the housing body 104) and a grip portion 108 (also referred to simply as the grip 108). In the present example the grip 108 is a pistol grip, although in other examples the grip 108 can have various other configurations, or can simply be omitted.

The housing 102, and in particular the housing body 104, supports various components of the mobile device 100. Certain components, including microcontrollers, communication assemblies, and the like, are contained within the housing body 104 and are not exposed to the exterior of the mobile device 100 during use. Other components provide an operator interface of the mobile device 100, and are therefore at least partially exposed to the exterior of the mobile device 100. Such interface components include a display module 112 (e.g. including a touch screen) and a keypad module 116. As illustrated in FIG. 1, the display module 112 and the keypad module 116 are supported by the housing body 104 to expose surfaces thereof to the exterior of the mobile device 100, for access and manipulation by an operator of the mobile device 100. The mobile device 100 can also include further components, such as a data capture assembly 117 (e.g. a barcode scanner) mounted on the housing body 104. The device 100 is powered by a battery 118. In the present example, the battery 118 is a rechargeable battery that is removable from the housing 102.

The keypad module 116 supports a plurality of keys 120 such that the keys 120 are exposed at an upper, or input, surface of the keypad module 116 that is substantially coplanar with the display module 112. The keypad module 116 also includes, in the present example, a microphone aperture 122. The input surface mentioned above is defined by any components of the keypad module 116 that are exposed to an operator of the mobile device 100 when the mobile device 100 is in use (e.g. held by the grip 108, with the keys 120 and the display module 112 facing up towards the operator).

Similar nomenclature is also used elsewhere in the discussion below, with the term "upper" indicating an orientation or position towards the input surface 121, and the term "lower" indicating an orientation or position away from the input surface 121 (e.g. in the general direction of the grip 108). The terms "forward" and "rear" are also employed in the discussion below. The term "forward" refers to a position or orientation towards the display module 112, while the term "rear" refers to a position or orientation away the display module 112. For clarity, the above-mentioned terms are indicated in FIG. 1 on corresponding axes 124 and 128.

As will be discussed below in greater detail, the keypad module 116 can be removed from the device 100 and replaced as a unit. The keypad module 116 and the housing 102 include various structural features that enable the removal and replacement of the keypad module 116 while also providing ingress protection to the device 100. Ingress protection reduces or eliminates the entry of contaminants such as dust and water into the housing body 104. To that end, the device 100 includes a latching mechanism for the keypad module 116 that may be configured to be inaccessible from the exterior of the device 100 when the device 100 is operational (e.g. when the battery 118 is inserted in the housing 102).

The latching mechanism may also be configured to reduce the need for externally-applied fasteners (e.g. screws) to secure the keypad module 116. As will be apparent to those skilled in the art, such fasteners require holes extending through the keypad module 116 and into the housing 102, and therefore may increase the risk of dust or water ingress. Reducing the use of such fasteners may therefore enable more effective ingress protection, and may also reduce the amount of space on or in the keypad module 116 and the housing 102 that must be reserved for fastener holes.

Figure 2:
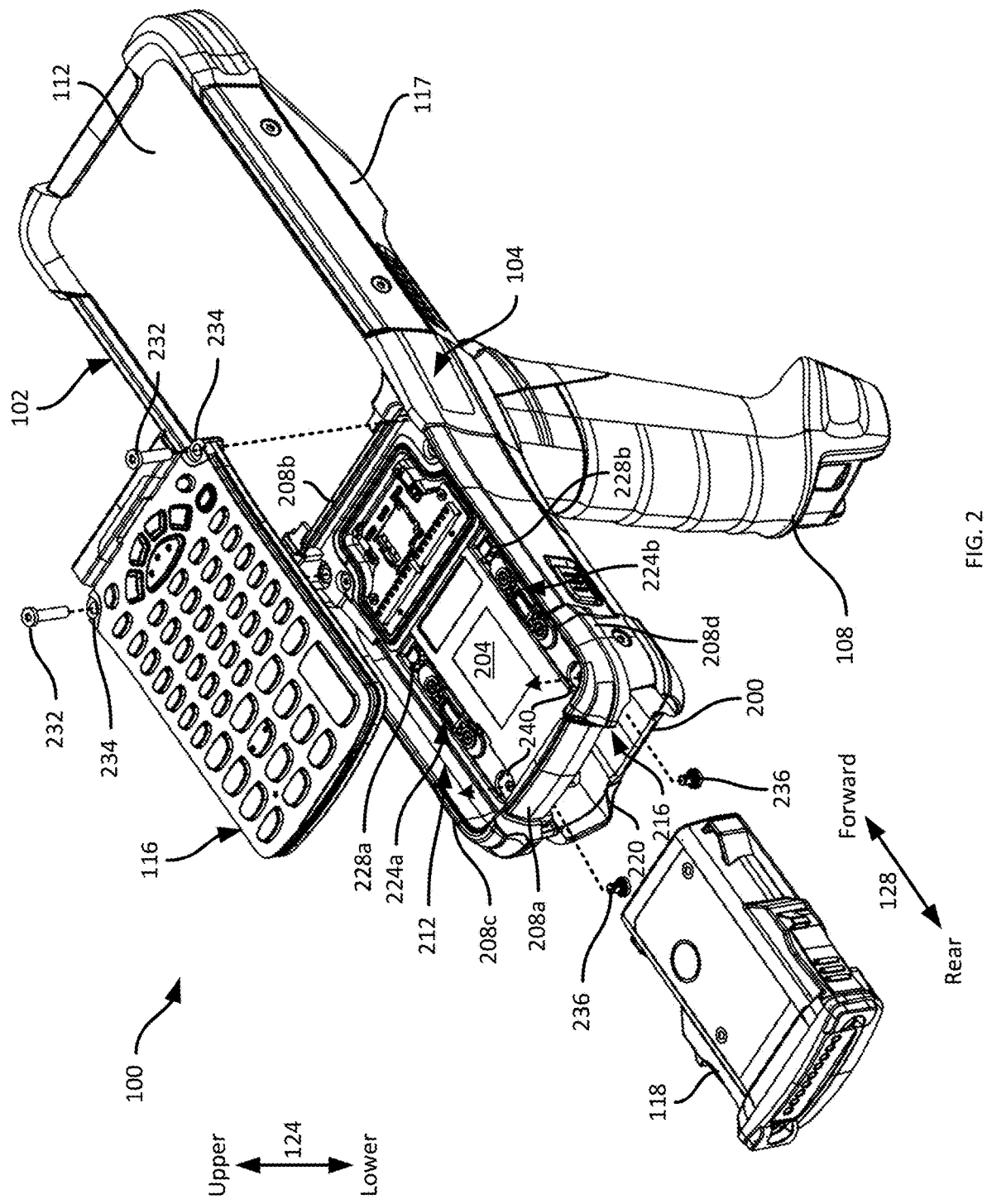
FIG. 2 is an exploded view of the mobile computing device of FIG. 1, viewed from above.

The above-mentioned structural features, including certain aspects of the latching mechanism, will now be discussed with reference to FIGS. 2 and 3, which illustrate partially exploded views of the device 100. In particular, FIG. 2 illustrates the device 100 with the keypad module 116 removed and the battery 118 withdrawn from the housing 102 to illustrate features of the housing 102 that enable the mounting and removal of the keypad module 116.

The housing 102 includes a lower wall 200 and a keypad seat 204, which in the present example are substantially parallel with one another. The lower wall 200 and the keypad seat 204 are joined by a set of side walls 208. In the present example, the side walls 208 include a rear side wall 208a, a forward side wall 208b, and left and right side walls 208c and 208d, as a result of the substantially rectangular shape of the housing body 104. The side walls 208 also extend upwards from the keypad seat 204, to form a keypad bay opening into which the keypad module 116 is placed when mounting the keypad module 116 to the device 100.

The keypad seat 204 and side walls 208 define a keypad bay 212. The keypad bay 212 is configured to receive the keypad module 116 via the above-mentioned bay opening, such that the keypad module 116 rests on the keypad seat 204, while a perimeter of the keypad module 116 is enclosed by the side walls 208.

In addition, the lower wall 200, the keypad seat 204 and the side walls 208 define an access compartment 216 below the keypad bay 212. That is, the lower wall 200 defines the bottom of the access compartment 216, and the keypad seat 204 defines the top of the access compartment 216. The side walls 208, meanwhile, define the sides of the access compartment 216. As will be apparent from FIG. 2, the access compartment 216 is the compartment in which the battery 118 is housed when the battery 118 is inserted into the housing 102. The access compartment 216 may therefore also be referred to as the battery compartment 216. In other embodiments, however, the access compartment 216 can be a different compartment than the one in which the battery 118 is housed.

The interior of the access compartment 216 is accessible from outside the device 100 (e.g. by an operator of the device 100) via an access opening 220 defined in one of the side walls 208. In the present example, the access opening 220 is defined through the rear side wall 208a, and also serves as the opening through which the battery 118 is inserted and withdrawn into and out of the device 100. When the battery 118 is not in the access compartment 216, the access opening 220 permits access to components of a latching mechanism of the device 100. The latching mechanism includes at least one latch 224. In the present example, two latches 224a and 224b are provided, and are slidably mounted in the keypad bay 212. In particular, the latches 224 are slidably mounted to the keypad seat 204. The latches 224 are each movable between a locked position and an unlocked position.

In the locked position, respective hooks 228a and 228b of each latch 224 engage with complementary recesses 300a and 300b (shown in FIG. 3) on a lower surface 304 of the keypad module 116 to secure the keypad module 116 in the keypad bay 212. Securing the keypad module 116 within the keypad bay 212 can also include applying forward fasteners 232, such as threaded screws, through holes 234 in the keypad module 116 and into corresponding apertures in the keypad seat 204. Securing the keypad module 116 within the keypad bay 212 can further include applying rear fasteners 236, from within the access compartment 216, through openings 240 in the keypad seat 204 and into corresponding apertures 308 on the lower surface 304 of the keypad module 116.

In the unlocked position, the latch 224 disengages with the keypad module 116 to enable removal of the keypad module 116 from the keypad bay 212. Movement of the latches 224 between the locked and unlocked positions can be achieved via the application of an input force to respective portions of the latches 224 from within the access compartment 216. Specifically, the latches 224a and 224b include respective activation members 312a and 312b, shown in FIG. 3, disposed within the access compartment 216 (specifically, on the lower surface of the keypad seat 204). The activation members 312 are therefore accessible to an operator of the device 100 to move the latches 224 between the unlocked and locked positions. In the illustrated example, the activation members 312 have ends disposed adjacent to the access opening 220 (shown in FIG. 2).

Figure 3:
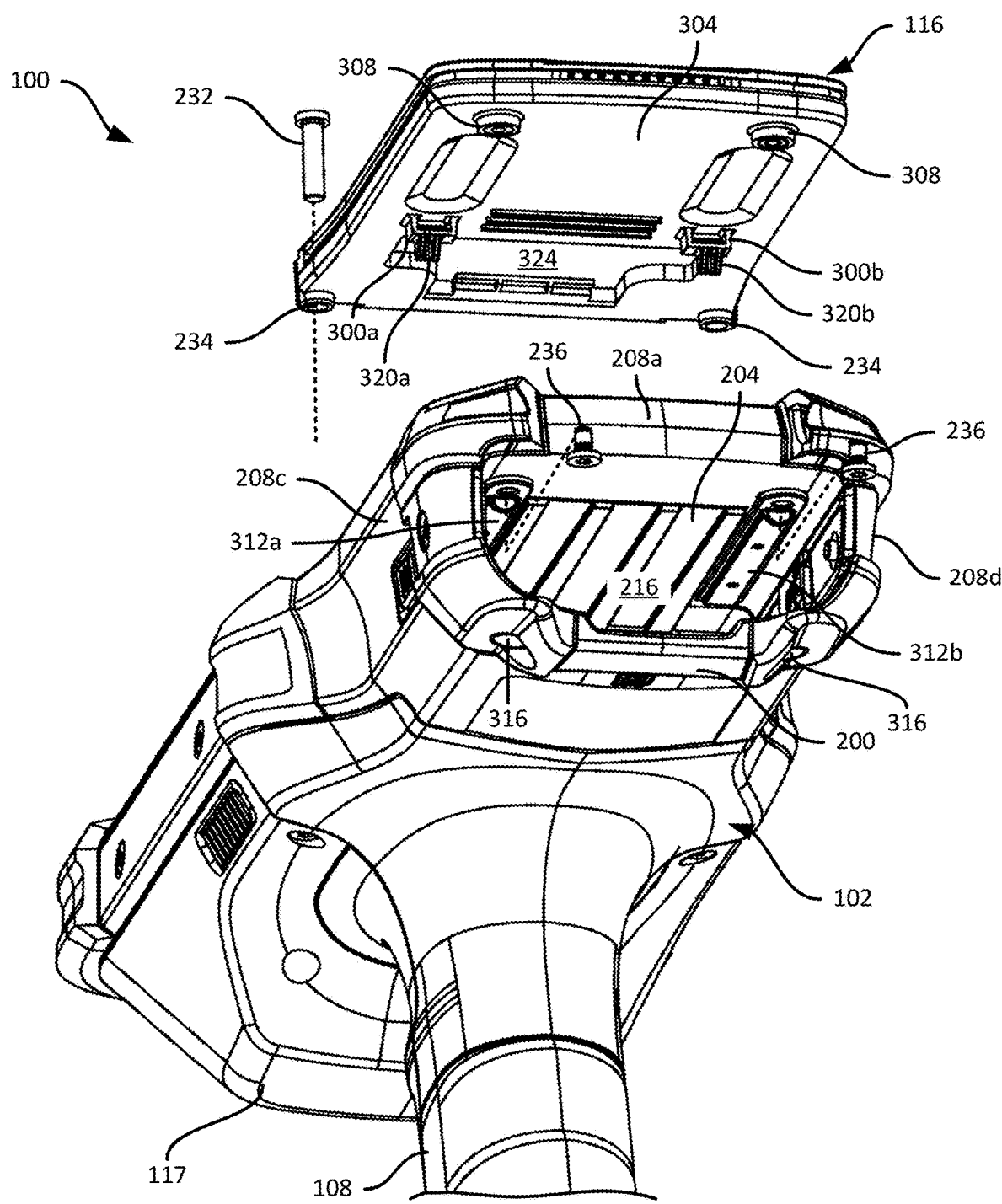
FIG. 3 is an exploded view of the mobile computing device of FIG. 1, viewed from below.

As also seen in FIG. 3, in the present example, the rear fasteners 236 extend through openings in the activation members 312, in order to affix the activation members 312 to the keypad module 116. The housing 102 can also defined, as shown in FIG. 3, access holes 316 through the lower wall 200. The access holes 316 are coaxial with the insertion path of the rear fasteners 236 (shown in dashed lines) and the openings 240 (shown in FIG. 2), permitting a tool such as a screwdriver to be inserted into the access compartment 216 to both manipulate the activation members 312 and tighten or loosen the rear fasteners 236.

In the present example, as also shown in FIG. 3, the keypad module 116 can include respective cam members 320a and 320b depending from the recesses 300a and 300b. The cam members 320, as will be illustrated in greater detail further below, are wedge-shaped members with sloped surfaces that engage with the hooks 228 of the latches 224 when the keypad module 116 is inserted into the keypad bay 212, to move the latches 224 from the locked position to the unlocked position without additional manipulation of the latches being required by of operator (e.g. via the access compartment 216). In other examples, the cam members 320 can be placed elsewhere on the keypad module 116, or can simply be omitted.

The keypad module 116 includes an interface 324 configured to electrically interconnect the keypad module 116 with a processor or other controller of the device 100 within the housing 102. The device 100 also includes a corresponding interface disposed within the keypad bay 212, shown in greater detail in FIG. 4.

Figure 4:
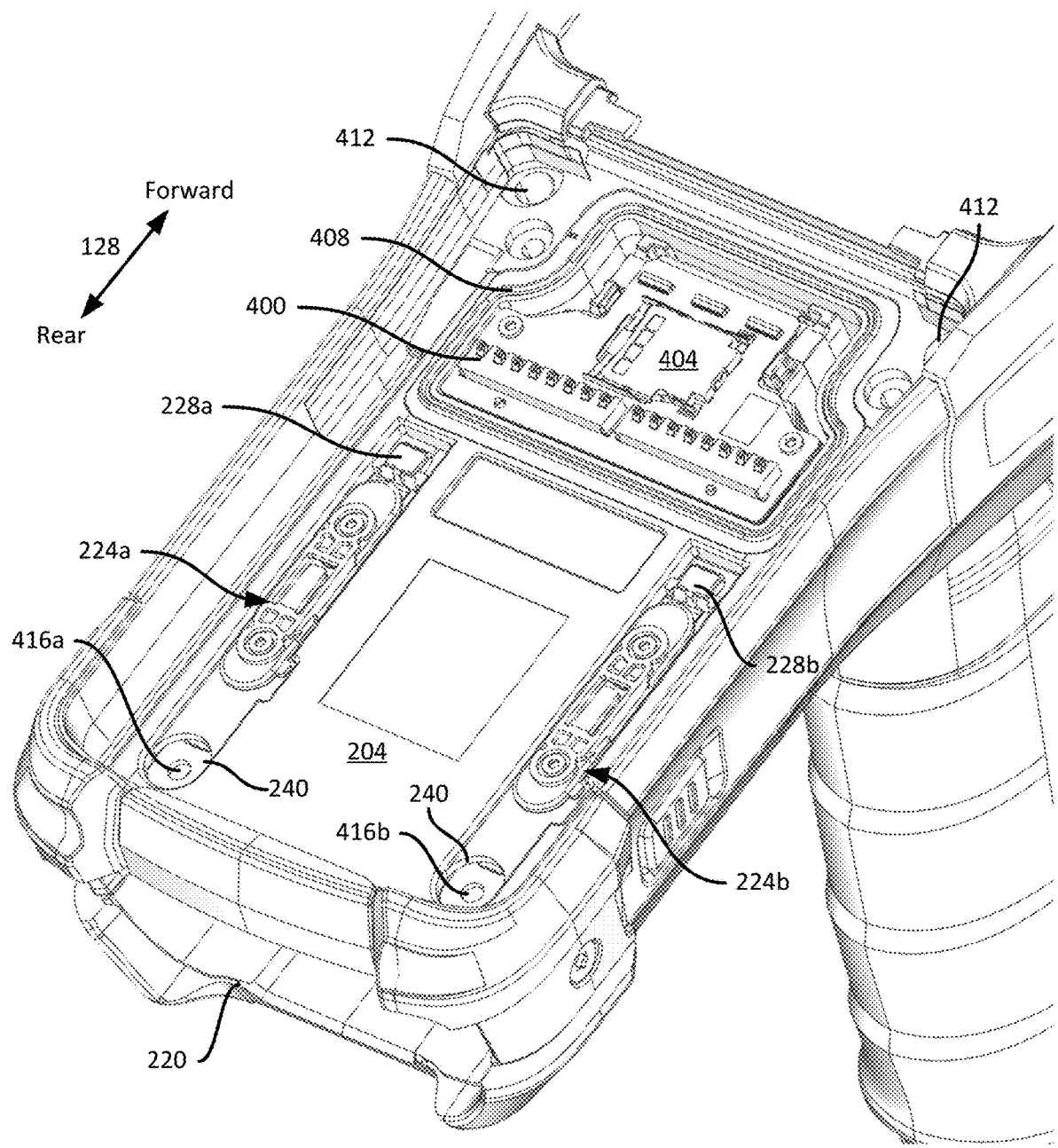
FIG. 4 is a diagram of a keypad bay of the mobile computing device of FIG. 1.

As illustrated in FIG. 4, the device 100 includes a set of connectors 400 disposed on the keypad seat 204, configured to electrically connect the keypad module 116 to a controller (and other internal components, as needed) of the device 100 via the interface 324 of the keypad module 116. The device 100 can also include a storage bay 404, such as a microSD card slot, adjacent to the connectors 400. As will now be apparent, removal of the keypad module 116 is necessary to access the storage bay 404 (e.g. to insert or remove a microSD card or other suitable memory device).

The connectors 400 and the storage bay 404 are surrounded by a seal 408 (e.g. a rubber gasket or the like) that engages with the lower surface 304 of the keypad module 116 to reduce or prevent entry of contaminants into the housing 102. As will now be apparent, the forward fasteners 232, the rear fasteners 236 and the latches 224 serve to secure the keypad module 116 and apply consistent pressure between the lower surface 304 and the seal 408, to mitigate or prevent entry of contaminants. To that end, the hooks 228 of the latches 224 are placed adjacent to the seal 408. The hooks 228, and openings 412 for receiving the forward fasteners 232, thus form a perimeter around the seal 408 to apply the above-mentioned consistent pressure.

Also shown in FIG. 4 are the above-mentioned openings 240 through the keypad seat 204, as well as respective holes 416a and 416b through the activation members 312a and 312b of the latches 224a and 224b. The holes 416 enable passage of the rear fasteners 236 through the latches 224 and into the apertures 308 of the keypad module 116.

Figure 5:
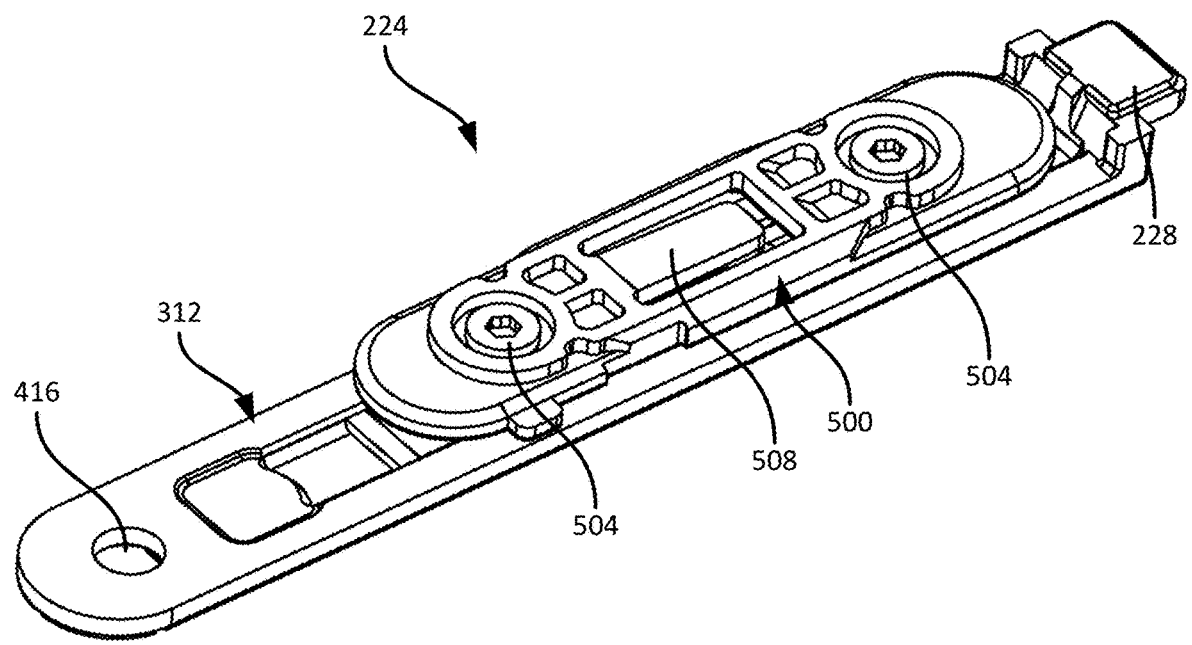
FIG. 5 is an isometric view of a latch of the mobile computing device of FIG. 1, viewed from above.
Figure 6:
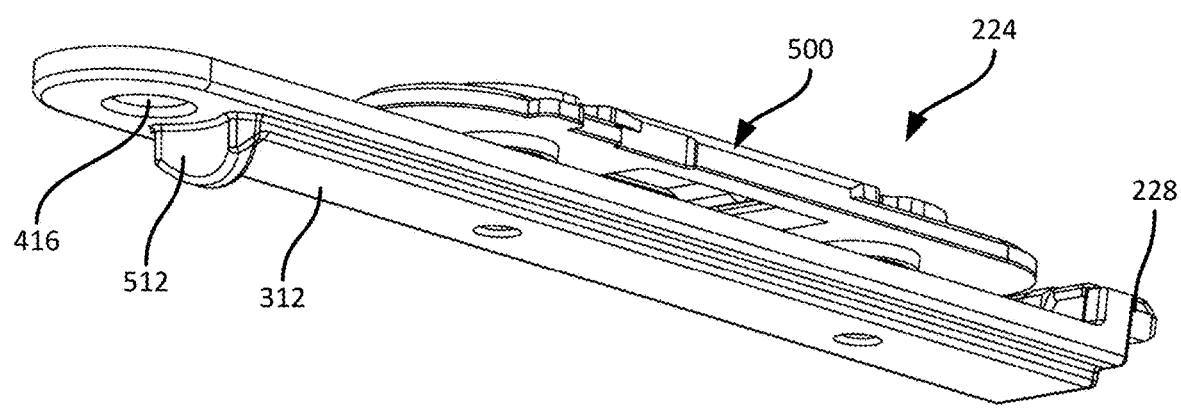
FIG. 6 is an isometric view of a latch of the mobile computing device of FIG. 1, viewed from below.

Turning now to FIGS. 5 and 6, upper and lower views are shown of a latch 224 in isolation. As seen in FIGS. 5 and 6, the latch 224 includes a mounting plate 500 as well as the activation member 312 mentioned above. The mounting plate 500 is configured to be disposed above the keypad seat 204, while the activation member 312 is configured to be disposed below the keypad seat 204, in the access compartment 216. The mounting plate 500 and the activation member 312 are fastened to one another by fasteners 504 (e.g. screws) extending through the keypad seat 204. The keypad seat 204 therefore includes slots allowing the fasteners 504 to extend therethrough, and also permitting movement of the latch 224 between the unlocked and locked positions.

As seen in FIGS. 5 and 6, the hook 228 is defined by a portion of the activation member 312. The keypad seat 204 therefore includes a port therethrough permitting the hook 228 to extend from the activation member 312 (which lies in the access compartment 216) into the keypad bay 212. In other examples, the hook 228 can instead be a portion of the mounting plate 500. Further, as shown in FIG. 5, the mounting plate 500 can include a resilient tab 508 configured to engage with a corresponding bump feature on the keypad seat 204 to assist in maintaining the position of the latch 224, as will be discussed in further detail below. In other examples, the tab 508 and the above-mentioned bump can be omitted.

FIG. 6 also illustrates a strike plate 512 extending downwards from the activation member 312. Also visible in FIG. 3, the strike plate 512 enables an operator of the device 100 to push the latch 224 towards the locked position, either manually or by way of a tool (e.g. a screwdriver, as noted earlier).

Figure 7:
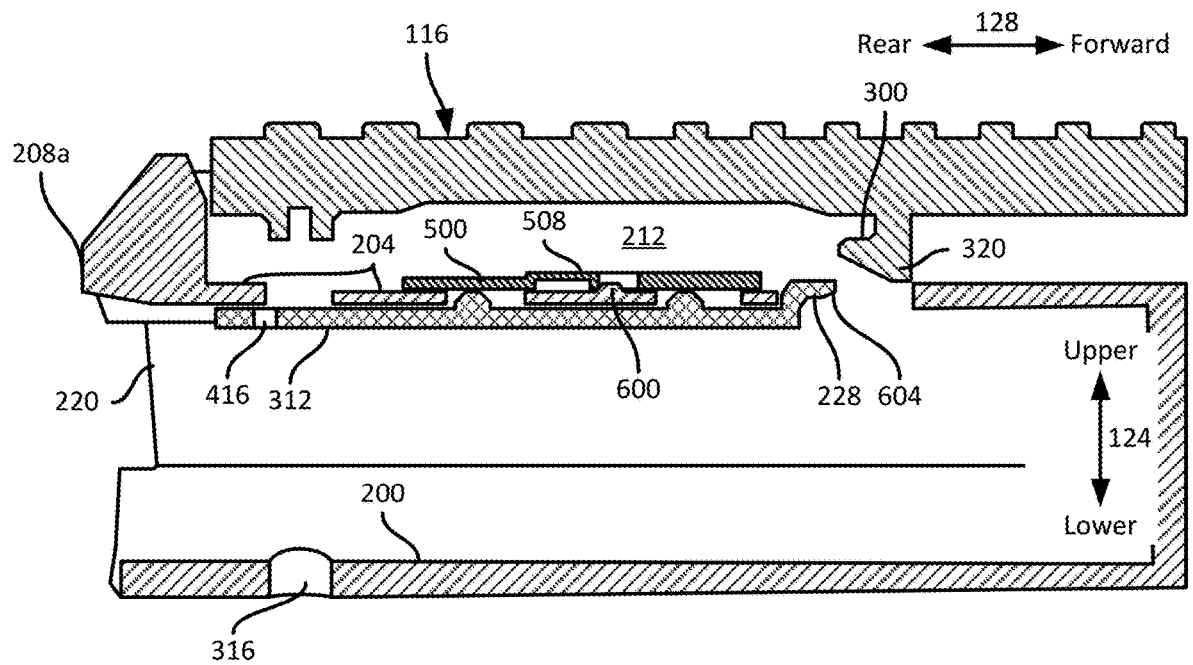
FIG. 7 is a partial cross-section of the mobile computing device of FIG. 1 with the latch in an unlocked position.
Figure 8:
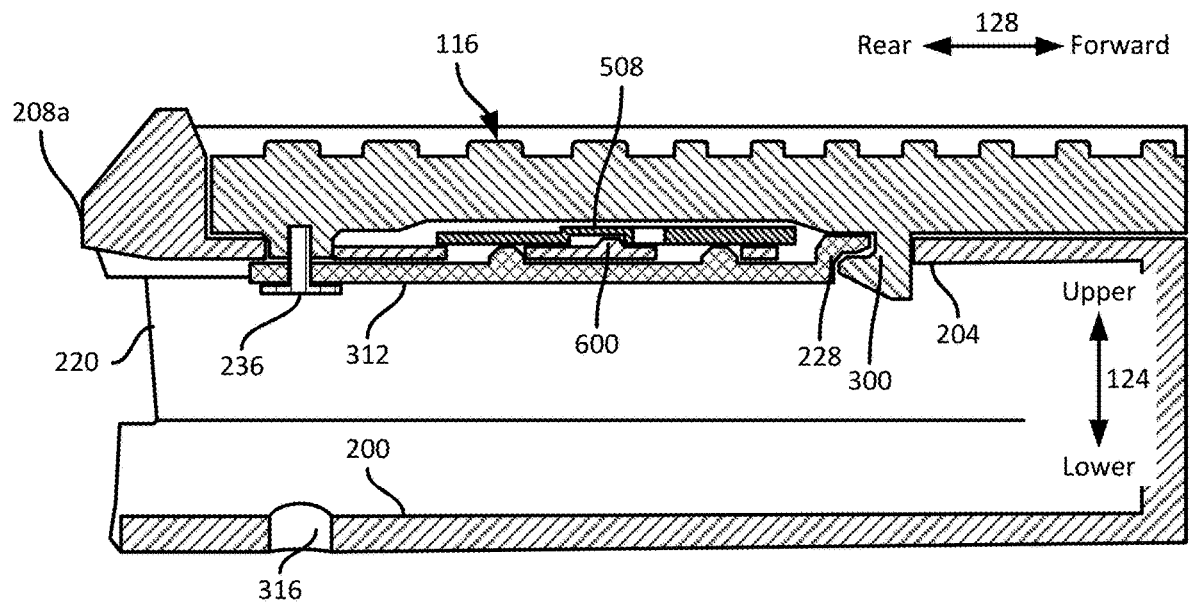
FIG. 8 is a partial cross-section of the mobile computing device of FIG. 1 with the latch in an locked position.

Turning to FIGS. 7 and 8, cross-sectional views of a portion of the device 100 are illustrated, showing the operation of a latch 224 to secure the keypad module 116 in the keypad bay 212. FIG. 7, in particular, illustrates the keypad module 116 as not yet being inserted into the keypad bay 212. The latch 224 is in the unlocked position, and is therefore shifted rearward relative to the device housing 102. As noted above, the keypad seat 204 can include a bump 600 configured to engage with the tab 508 of the mounting plate 500. In the position shown in FIG. 7, the tab 508 engages with a rear side of the bump 600, and thus maintains the latch 224 in the unlocked position.

When the keypad module 116 is inserted into the keypad bay 212, the cam 320 pushes the latch 224 into the unlocked position if the latch 224 is not already unlocked. As shown in FIG. 8, the latch 224 is then pushed to the locked position, e.g. via application of a force to the activation member 312. The latch 224 therefore slides forward to engage the hook 228 with the recess 300. The hook 228 can include a sloped surface 604, to pull the keypad module 116 down toward the keypad seat 204 during the transition to the locked position. The tab 508 deforms and slides over the bump 600, to engage with the forward side of the bump 600 and thereby maintain the latch 224 in the locked position while the rear fastener 236 is applied (via the hole 416 in the activation member 312). As seen in FIG. 8, the rear fastener 326 extends through the activation member 312 and the keypad seat 204, and into the keypad module 116.

Figure 9:
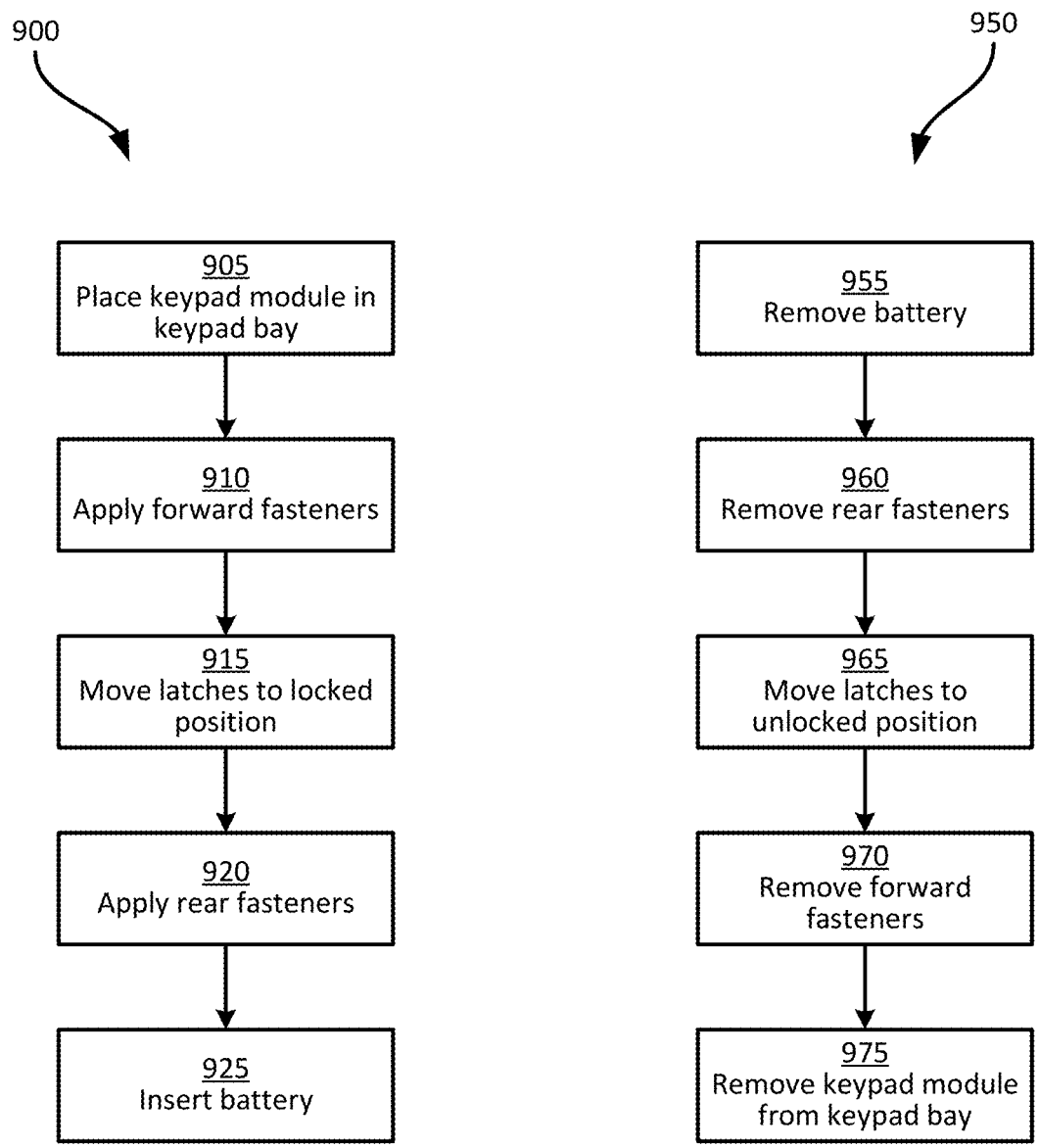
FIG. 9 illustrates flowcharts of methods of inserting and removing a keypad module.

Turning to FIG. 9, methods 900 and 950, respectively, of inserting and removing the keypad module 116 are illustrated. To insert the keypad module 116, the keypad module 116 is placed into the keypad bay 212 at block 905. At block 910, the forward fasteners 232 are applied. At block 915, the latches 224 are moved to the locked position, e.g. via application of force to the activation members 312. At block 920, the rear fasteners 236 are applied, fixing the latches 224 in the locked position. At block 925, the battery 118 is inserted into the access compartment 216.

To remove the keypad module 116, as shown by the method 950, the battery 118 is removed at block 955. At block 960, the rear fasteners 236 are removed. At block 965, the latches 224 are moved to the unlocked position, e.g. by contacting the strike plates 512, via the access holes 316, with the same tool used to remove the rear fasteners 236. At block 970, the forward fasteners 232 are removed, and at block 975 the keypad module 116 is lifted from the keypad bay 212.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
   a device housing including:
      a lower wall;
      a keypad seat;
      side walls joining the lower wall to the keypad seat and extending upwards from the keypad seat and defining (i) an access compartment between the lower wall, the side walls and a lower surface of the keypad seat, and (ii) a keypad bay between an upper surface of the keypad seat and the side walls, the keypad bay having a bay opening and configured to receive a keypad module;
   a latch slidably mounted to the keypad seat and movable between a locked position and an unlocked position, the latch including:
      a hook configured to engage a corresponding recess of the keypad module in the locked position and secure the keypad module in the keypad bay, and to disengage from the recess in the unlocked position to enable removal of the keypad module; and
      an activation member disposed within the access compartment and configured to receive an input to transition the latch from the unlocked position to the locked position.

2. The mobile computing device of claim 1, wherein the side walls include an access opening between the lower wall and the keypad seat, enabling access to the access compartment from an exterior of the device.

3. The mobile computing device of claim 2, wherein the access compartment is a battery compartment; and
   wherein the device further includes a removable battery that, when inserted into the battery compartment, closes the access opening and prevents access to the activation member.

4. The mobile computing device of claim 2, wherein the activation member is on a lower side of the keypad seat, adjacent to the access opening.

5. The mobile computing device of claim 4, wherein the latch includes a mounting plate within the keypad bay, connected to the activation member via one or more slots through the keypad seat; and
   wherein the hook is affixed to one of the mounting plate and the activation member.

6. The mobile computing device of claim 5, wherein the hook is affixed to the activation member, and the keypad seat includes a port for the hook to extend into the keypad bay.

7. The mobile computing device of claim 1, wherein the activation member includes a strike plate extending into the access compartment, for receiving the input.

8. The mobile computing device of claim 1, wherein the activation member includes a first hole, the keypad seat includes a second hole, and wherein the first and second holes align when the latch is in the locked position, to receive a fastener configured to engage with the keypad module and fix the keypad module to the activation member via the keypad seat.

9. The mobile computing device of claim 8, further including an access hole through the lower wall, coaxial with the second hole of the keypad seat, to receive a tool for applying the fastener.

10. The mobile computing device of claim 1, wherein the keypad module includes a cam extending from a lower surface of the keypad module to displace the latch from the locked position to the unlocked position responsive to insertion of the keypad module in the keypad bay.

11. The mobile computing device of claim 10, wherein the cam includes a sloped surface configured to contact the hook.

12. The mobile computing device of claim 1, further comprising a second latch slidably mounted to the keypad seat and movable between the locked position and the unlocked position.

13. The mobile computing device of claim 1, further comprising:
 a controller supported in the device housing;
 a set of connectors on the keypad seat configured to electrically connect the keypad module to the device controller; and
 a seal surrounding the set of connectors;
 wherein the hook is positioned adjacent to the seal.

14. The mobile computing device of claim 13, further comprising:
 a storage bay on the keypad seat configured to receive a removable storage medium;
 wherein the seal surrounds the set of connectors and the storage bay.

15. A method of installing a keypad module in a mobile computing device, the method comprising:
 placing the keypad module in a keypad bay of the mobile computing device defined by a keypad seat and a plurality of side walls; and
 applying, via an access compartment below the keypad bay, an input to an activation member of a latch to transition the latch from an unlocked position to a locked position to secure the keypad module in the keypad bay.

16. The method of claim 15, further comprising:
 prior to applying the input to the activation member, removing a battery from the access compartment.

17. The method of claim 16, further comprising:
 after applying the input, reinserting the battery into the access compartment.

18. The method of claim 16, further comprising:
 prior to applying the input, applying a fastener at a forward portion of the keypad module.

19. The method of claim 16, further comprising:
 after applying the input, applying a fastener from within the access compartment to a rear portion of the keypad module.

20. The method of claim 19, wherein applying the fastener includes inserting the fastener through a first opening in the activation member, a second opening in the keypad seat, and into an aperture of the keypad module.

* * * * *